PULSE-SIGNAL TRANSLATING ARRANGEMENT

Filed Oct. 23, 1948

INVENTORS.
JOHN THOMAS YATES
IAN NORMAN VAUGHAN-JONES
BY John A. Harvey
ATTORNEY

UNITED STATES PATENT OFFICE 2,597,833

PULSE-SIGNAL TRANSLATING ARRANGEMENT

John Thomas Yates and Ian Norman Vaughan-Jones, Hollinwood, England, assignors to Hazeltine Research, Inc., Chicago, Ill., a corporation of Illinois Application October 23, 1948, Serial No. 56,142
In Great Britain November 8, 1947

8 Claims. (Cl. 250—27)

Figures 1, 2:
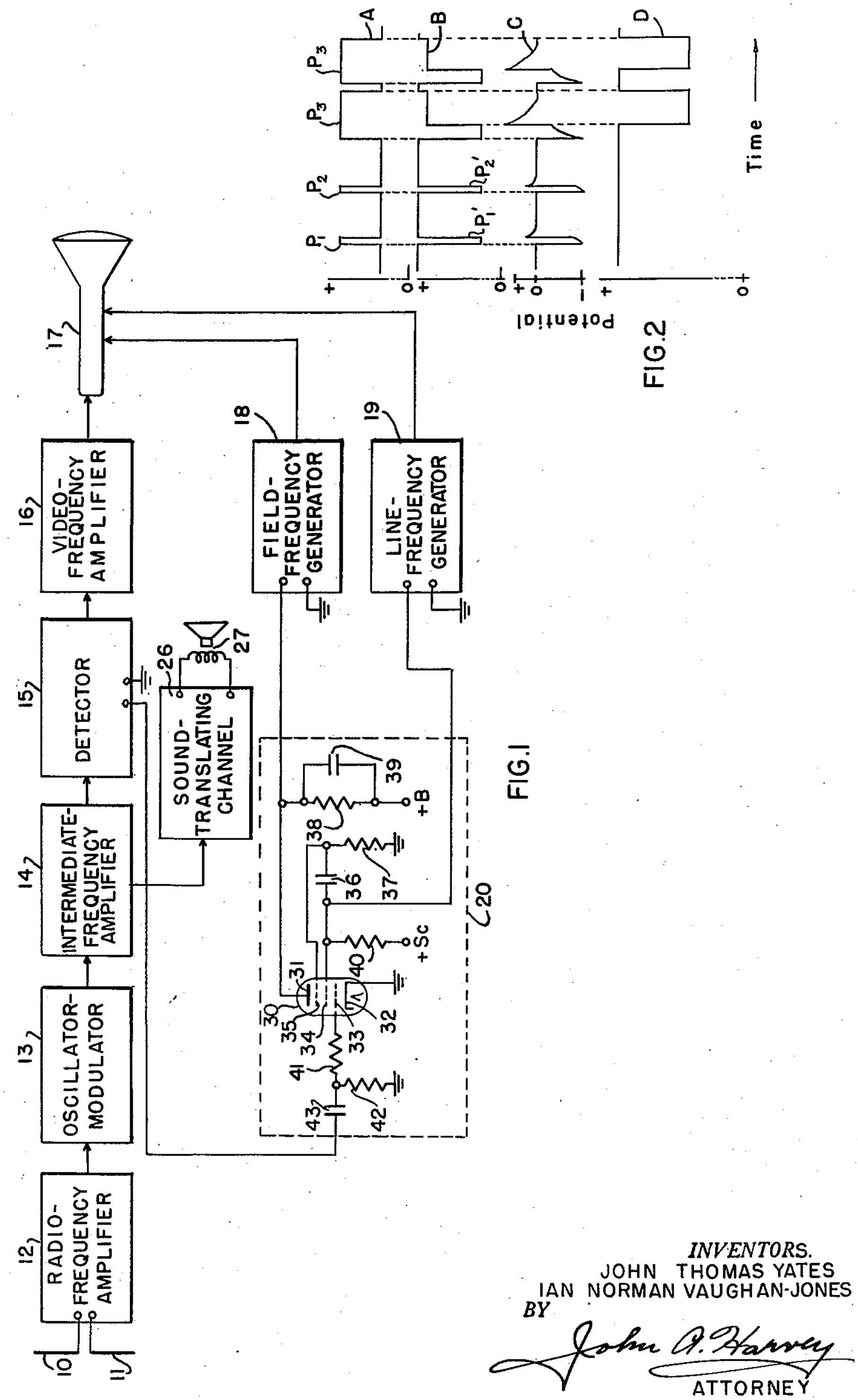

The present invention relates to pulse-signal translating arrangements of the type which amplify and effectively separate in individual output circuits signal pulses of short duration and signal pulses of longer duration. While the invention has utility in a wide range of applications, it has particular utility in a television receiver for separating the line-frequency and field-frequency synchronizing pulses of a received television signal and will be described in that environment.

It is conventional present-day practice to transmit a television signal having video or image-signal frequency components, line-frequency synchronizing-signal components, and field-frequency synchronizing components. A conventional television receiver receives this signal and effects a separation of the video-frequency components from the synchronizing-signal components after which the line-frequency and field-frequency synchronizing components are separated from each other and applied to control the synchronized operation of line-scanning and field-scanning generators.

The separation of the synchronizing-signal components from the video-frequency components is conventionally performed on an amplitude-selective basis premised upon the fact that the synchronizing-signal components lie in a "blacker-than-black" amplitude region of the television signal. The separation of the line-frequency synchronizing components from the field-frequency synchronizing components is conventionally performed by arrangements utilizing resistive-capacitive networks having inverse frequency band-pass characteristics. In order that the scanning generators of the receiver shall have no interaction with each other by feedback through the synchronizing-signal separating networks last mentioned, it is conventional to employ at least one amplifier stage between one of the network sections and its corresponding scanning generator by which to isolate the generators from each other. While arrangements of this type have in general performed satisfactorily, it would be desirable to provide a much simplified and less expensive arrangement for separating the line-synchronizing and field-synchronizing signal components from the television signal and from each other.

Another proposed arrangement for separating the synchronizing-signal components from the video-frequency components of a television signal utilizes an amplifier tube having a control electrode to which the composite television signal is applied with the synchronizing-signal components of such polarity as to render the control electrode conductive only during the occurrence of the line-frequency and field-frequency synchronizing pulses. This amplifier stage includes two output circuits designed to be selectively responsive to the line-frequency and field-frequency synchronizing components in order that these components may be separated into individual ones of the output circuits. It is usually found necessary with this type of arrangement, however, to include a rectifier device in each of the output circuits so as to prevent undesired interaction between the scanning generators coupled to these circuits, thus requiring the use of three vacuum tubes. If one or more of these rectifier devices are omitted from the arrangement described, it has been found in practice that there is substantial likelihood of undesirable interaction occurring between the scanning generators or of poor interlacing occurring by virtue of the development of a field-frequency synchronizing pulse having an insufficiently steep leading edge.

It is an object of the present invention, therefore, to provide a new and improved pulse-signal translating arrangement which is effective to separate pulses of unequal durations and to develop the shorter-duration pulses in one output circuit and the longer-duration pulses in another output circuit of the arrangement.

It is an additional object of the invention to provide a pulse-signal translating arrangement of simple and inexpensive construction and one particularly suitable for use in a television receiver by which to effect separation of the synchronizing-signal components from the video-frequency components of a received television signal and also to effect separation of the field-synchronizing and line-synchronizing pulses from each other.

It is a further object of the invention to provide a new and improved pulse-signal translating arrangement which, when used as a synchronizing-signal separator in a television receiver, not only provides substantial freedom from interaction between the line-frequency and field-frequency scanning generators otherwise occasioned by feedback through the separator but also ensures that there is always applied to these generators line-frequency and field-frequency synchronizing pulses having steep leading edges by which to effect optimum synchronization of the generators.

In accordance with a particular form of the invention, a pulse-signal translating arrangement for translating a signal of pulse wave form having pulse durations of two values comprises a univibrator having stable and unstable operating conditions and including an input circuit arranged to have the above-mentioned signal applied thereto. The arrangement also comprises a control circuit coupled to the input circuit and proportioned to maintain the univibrator in a stable de-energized operating condition in the intervals between the pulses of the signal but to cause the univibrator to initiate operation in the unstable operating condition upon the occurrence of each pulse of the applied signal. The univibrator includes two output circuits in which the voltages thereof vary in opposite senses with changes from one of the operating conditions to the other, one of the output circuits including a time-constant circuit. The time constant of the time-constant circuit is so proportioned as to maintain the univibrator in its unstable operating condition for an interval longer than the shorter-duration pulses of the signal but shorter than the longer-duration pulses thereof, whereby the univibrator translates the signal to develop the shorter-duration pulses primarily only in one of the output circuits and to develop the longer-duration pulses primarily in the other of the output circuits.

For a better understanding of the present invention, together with other and further objects thereof, reference is had to the following description taken in connection with the accompanying drawing, and its scope will be pointed out in the appended claims.

Referring now to the drawing, Fig. 1 is a circuit diagram, partly schematic, of a complete television receiver embodying the present invention in a particular form; and Fig. 2 represents graphically voltage relationships occurring at selected points in the Fig. 1 arrangement and is used as an aid in explaining the operation of the invention.

Referring now more particularly to Fig. 1 of the drawing, the receiver shown is of the superheterodyne type including an antenna system 10, 11 coupled to a radio-frequency amplifier 12 to which is coupled in cascade, in the order named, an oscillator-modulator 13, an intermediate-frequency amplifier 14, a detector 15, a video-frequency amplifier 16, and an image-reproducing device 17. A field-scanning generator 18 and a line-scanning generator 19 are coupled to an output circuit of the detector 15 through a synchronizing-signal separator 20, more fully described hereinafter. The field-scanning generator 18 and the line-scanning generator 19 are coupled to field-deflecting and line-deflecting windings, not shown, associated with the image-reproducing device 17 in conventional manner. A sound-signal translating channel 26 and associated loudspeaker 27 are coupled to an output circuit of the intermediate-frequency amplifier 14 in order to translate and reproduce sound signals accompanying the received television program. The stages or units 10—27, inclusive, with the exception of unit 20 presently to be described, may all be of conventional well-known construction so that detailed illustrations and descriptions thereof are deemed unnecessary herein.

Referring briefly to the operation of the system just described, television signals intercepted by the antenna system 10, 11 are selected and amplified in the radio-frequency amplifier 12 and are applied to the oscillator-modulator 13 wherein they are converted into intermediate-frequency signals. The latter in turn are selectively amplified in the intermediate-frequency amplifier 14 and applied to the detector 15. The modulation components of the signal are derived by the detector 15 and are applied to the video-frequency amplifier 16 wherein they are amplified and from which they are applied, in the usual manner, to a brilliancy-control electrode of the image-reproducing device 17. Modulation components derived in the detector 15 are also applied to the synchronizing-signal separator 20 which separates the synchronizing components from the composite television signal and supplies the field-frequency and line-frequency signals to the synchronizing control circuits of the respective field-scanning generator 18 and line-scanning generator 19. Scanning waves are generated by the generators 18 and 19, in synchronism with the synchronizing-voltage pulses applied thereto from the synchronizing-signal separator 20, and these generated waves are applied to the scanning elements of the image-reproducing device 17 to deflect the scanning ray of the latter in two directions normal to each other so as to trace a rectilinear scanning pattern on the screen of the device 17 and thereby reconstruct the transmitted image.

Referring now more particularly to that portion of the receiver of Fig. 1 which embodies the present invention, the synchronizing-signal separator 20 is essentially a pulse-signal translating arrangement comprised by a transitron type of univibrator which includes a vacuum tube 30 having an anode 31, a cathode 32, a space-current control electrode 33, and a plurality of electron-permeable intermediate electrodes which may comprise a screen electrode 34 and a suppressor electrode 35. The screen electrode 34 and suppressor electrode 35 are intercoupled by a time-constant circuit, comprising a series-coupling condenser 36 and a shunt resistor 37 connected between the suppressor electrode 35 and ground, which is effective to return the univibrator to a stable operating condition a predetermined time interval after an unstable operating condition thereof has been established. The univibrator includes two output circuits in which the voltages thereof vary in opposite senses with changes from one of the aforementioned operating conditions to the other. In particular, one of these output circuits comprises the anode circuit of the tube 30 and is coupled to the synchronizing-input circuit of the field-frequency generator 18. This circuit includes an anode load resistor 38 with shunt-connected condenser 39, the resistor 38 coupling the anode 31 of the tube 30 to a source of energizing potential, indicated as +B. The other output circuit last mentioned is coupled to the line-frequency generator 19 and includes a resistor 40 which couples the screen electrode 34 to a source of energizing potential, indicated as +Sc.

The unit 20 includes a control circuit, to which is applied the composite television signal derived in the output circuit of the detector 15 and including synchronizing-signal components having pulse durations of two values, effective to maintain the univibrator 30 in a de-energized operating condition in the intervals between the pulses of the signal but to cause the univibrator to initiate operation in its unstable operating condition upon the occurrence of each pulse of the signal. This control circuit is coupled to the space-current control electrode 33 of the tube 30 and includes a series resistor 41, a shunt resistor 42, and a series-coupling condenser 43.

Considering now the operation of the pulse-signal translating arrangement just described, and referring to the curves of Fig. 2, the composite television signal derived in the output circuit of the detector 15 is applied through the coupling condenser 43 to the space-current control electrode 33 of the tube 30. The applied signal has such polarity that the synchronizing-signal pulses thereof cause the electrode 33 to become conductive with respect to its associated cathode 32. The pulses are thus peak rectified to develop across the condenser 43 and resistor 42 a negative bias of sufficiently large value that the tube 30 is maintained at anode-current cut-off in the intervals between the synchronizing-signal pulses of the composite signal. It is apparent that this action is thus such that the video-frequency components of the composite television signal are not translated by the tube 30, which thus separates the synchronizing-signal components from the video-frequency components. The operation is much as though a signal having the wave form represented by curve A of Fig. 2 were applied to the electrode 33 of the tube 30. The synchronizing signal represented by curve A is shown as comprising two conventional equalizing pulses $P_1$ and $P_2$ which precede a serrated field-synchronizing pulse $P_3$ only a portion of which is shown.

In the intervals between the synchronizing pulses of the television signal, the anode 31 is at the full +B potential and the screen electrode 34 is at the full +Sc potential since the tube 30 is biased to space-current cutoff as previously mentioned. The application to the control electrode 33 of a synchronizing pulse $P_1$ causes the tube 30 suddenly to become conductive. The potential of the anode 31 thereupon tends suddenly to fall, but the simultaneous fall in the potential of the screen electrode 34 is coupled through the condenser 36 to the suppressor electrode 35 to effect an almost intantaneous reduction of the anode current to zero value and thereby return the anode to full +B potential. This extremely short pulse "spike" of anode potential variation is in practice usually negligible even in the absence of the condenser 39, but is entirely removed by the use of the condenser 39 which maintains essentially constant the voltage of the anode during its momentary conductive interval. The decrease of potential of the suppressor electrode 35 accelerates the increase of screen-electrode current and decrease of screen-electrode potential in a manner which is characteristic of transitron operation. The decrease of screen-electrode potential continues until a stable condition is reached at which maximum current flows in the screen-electrode circuit. There consequently is developed across the screen-electrode resistor 40, for application to the line-frequency generator 19, a potential pulse of negative polarity as indicated by pulse $P_1'$ of curve B. The coupling condenser 36 is normally charged to the full value of the screen-electrode potential +Sc during the interval when the tube 30 is cut off, and thus begins to discharge through the resistor 37 when the screen electrode 34 becomes conductive. The potential applied to the suppressor electrode 35 consequently rises exponentially toward zero value, but the synchronizing pulse $P_1$ terminates before the suppressor electrode voltage has decreased to a value which permits the flow of current to the anode 31. Since the tube 30 is again biased to space-current cutoff at the termination of the synchronizing pulse $P_1$, the potential of the screen electrode 34 again returns to the full potential of the source +Sc and the condenser 36 again recharges to the full value of the latter. The resulting potential variation of the suppressor electrode 35 is represented by curve C of Fig. 2. It will be noted from the operation thus far described, that the effect of the pulse $P_1$ is to develop at the screen electrode 34 an amplified and well-defined pulse, the length of which is approximately the same as that of the applied pulse $P_1$. This described operation prevails for the second equalizing pulse $P_2$, and likewise prevails for each of the line-synchronizing pulses of the television signal.

Upon the application to the control electrode 33 of the field-synchronizing pulse $P_3$ of the television signal, the initial operation is that previously described in that the anode 31 of the tube 30 momentarily draws current but is almost immediately rendered nonconductive by the sudden drop of potential of the suppressor electrode 35 consequent upon the corresponding drop of potential of the screen electrode 34. Now, however, the applied pulse $P_3$ is of such long duration that the condenser 36 discharges sufficiently that the potential of the suppressor electrode 35 permits the flow of current to the anode 31. The moment that this occurs, the flow of anode current reduces the current to the screen electrode 34. This decreases the potential drop across the screen-circuit resistor 40 with the result that the suppressor electrode 35 is driven more rapidly toward zero potential, thus further to increase the anode current and decrease the screen-electrode current. This action is cumulative and causes the anode potential to decrease almost instantaneously to a minimum value as represented by curve D. The screen-electrode potential similarly increases suddenly to a value that is slightly less than the potential of the source +Sc, as indicated by curve B, due to the fact that the screen-electrode current is not entirely cut off. The potentials of the anode 31 and screen electrode 34 remain at these values until the termination of the pulse $P_3$, whereupon the tube 30 is again biased to space-current cutoff by the self-bias potential developed by the control electrode 33. At this time, the potential of the anode 31 again increases to the full value of the source +B to terminate the first of the amplified and repeated field-frequency synchronizing pulses developed across the anode resistor 38 and applied to the field-frequency generator 18. It will be noted that each field-synchronizing pulse $P_3$ develops in the anode circuit of the tube 30 a well-defined amplified pulse having a very steep leading edge, the length of the pulse being the difference between the length of the field-synchronizing pulse and the length of the period required for the univibrator to go through a cycle of transitron operation.

It will be appreciated from the above description of the operation that the time constant of the condenser 36 and resistor 37 must be longer than the duration of the line-frequency synchronizing pulses but shorter than the duration of the field-frequency synchronizing pulses.

There is the important advantage with the translating arrangement described that any feedback of line-frequency pulses generated by the generator 19 do not affect the desired synchronized operation of the generator 18 since the anode current of the tube 30 has zero value for the duration of each line-synchronizing pulse.

Similarly, any feedback of pulses generated by the field-frequency generator 18 will affect the wave form of the potential developed in the circuit of the screen electrode 34 only in the event that the anode potential falls below the knee of the anode-voltage-current characteristic to cause the anode current to decrease, a condition which is not likely to occur in practice since the value of impedance of the anode load resistor 38 is relatively low. If such should occur, however, the only result will be to increase the screen current and thus reduce the potential of the screen electrode 34 during the interval between the end of the period of transitron operation and the end of the field-synchronizing pulse, but this does not in any manner affect the desired synchronized operation of the line-frequency generator 19. Minimized feedback of energy from one of the generators 18 and 19 to the other is thus attained by utilizing a relatively low value of resistance for the anode resistor 38 and a relatively large value of resistance for the screen-electrode resistor 40 so as to enhance the transitron mode of operation. If desired, the screen-electrode resistor 40 may be replaced by a pulse transformer to provide a high-impedance load in the screen-electrode circuit with a low-impedance output winding coupled to the generator 19.

It will be apparent from the above description of the invention that a pulse-signal translating arrangement embodying the invention has high utility as a synchronizing-signal separator of a television receiver and that, when it is so used, it effects by the use of a single tube the separation of the line-synchronizing and field-synchronizing pulses not only from the video-frequency components of the television signal but also from each other. The present arrangement has the additional advantage that it is of simple and inexpensive construction and is characterized by high reliability of operation.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A pulse-signal translating arrangement for translating a signal of pulse wave form having pulse durations of two values comprising: a univibrator having stable and unstable operating conditions and including an input circuit arranged to have said signal applied thereto; and a control circuit coupled to said input circuit and proportioned to maintain said univibrator in a stable de-energized operating condition in the intervals between the pulses of said signal but to cause said univibrator to initiate operation in said unstable operating condition upon the occurrence of each pulse of said signal; said univibrator including two output circuits in which the voltages thereof vary in opposite senses with changes from one of said operating conditions to the other, one of said output circuits including a time-constant circuit so proportioned and arranged as to maintain said univibrator in said unstable operating condition for an interval longer than the shorter-duration pulses of said signal but shorter than the longer-duration pulses thereof before permitting said univibrator to return to said stable operating condition, whereby said univibrator translates a signal representative of said signal to develop said shorter-duration pulses primarily only in one of said output circuits and to develop said longer-duration pulses primarily in the other of said output circuits.

2. A pulse-signal translating arrangement for translating a signal of pulse wave form having pulse durations of two values comprising: a univibrator having stable and unstable operating conditions and including at least one vacuum tube having a space-current control electrode arranged to have said signal applied thereto; and a control circuit coupled to said control electrode and proportioned to develop a unidirectional bias effective to maintain said univibrator in a stable de-energized operating condition in the intervals between the pulses of said signal but to cause said univibrator to initiate operation in said unstable operating condition upon the occurrence of each pulse of said signal; said univibrator including two output circuits in which the voltages thereof vary in opposite senses with changes from one of said operating conditions to the other, one of said output circuits including a time-constant circuit so proportioned and arranged as to maintain said univibrator in said unstable operating condition for an interval longer than the shorter-duration pulses of said signal but shorter than the longer-duration pulses thereof before permitting said univibrator to return to said stable operating condition, whereby said univibrator translates a signal representative of said signal to develop said shorter-duration pulses primarily only in one of said output circuits and to develop said longer-duration pulses primarily in the other of said output circuits.

3. A pulse-signal translating arrangement for translating a signal of pulse wave form having pulse durations of two values comprising: a univibrator having stable and unstable operating conditions and including an input circuit arranged to have said signal applied thereto; and a control circuit coupled to said input circuit and including means for maintaining said univibrator in a stable de-energized operating condition in the intervals between the pulses of said signal but to cause said univibrator to initiate operation in said unstable operating condition upon the occurrence of each pulse of said signal; said univibrator including two output circuits in which the voltages thereof vary in opposite senses with changes from one of said operating conditions to the other, one of said output circuits including a time-constant circuit so proportioned and arranged as to maintain said univibrator in said unstable operating condition for an interval longer than the shorter-duration pulses of said signal but shorter than the longer-duration pulses thereof before permitting said univibrator to return to said stable operating condition, whereby said univibrator translates a signal representative of said signal to develop said shorter-duration pulses primarily only in one of said output circuits and to develop said longer-duration purses primarily in the other of said output circuits.

4. A pulse-signal translating arrangement for translating a signal of pulse wave form having pulse durations of two values comprising: a univibrator having stable and unstable operating conditions and including an input circuit arranged to have said signal applied thereto; and a control circuit coupled to said input circuit and including a source of bias potential having a value so related to the amplitude of said signal as to maintain said univibrator in a stable de-energized operating condition in the intervals between the pulses of said signal but to cause said univibrator to initiate operation in said unstable operating condition upon the occurrence of each pulse of said signal; said univibrator including two output circuits in which the voltages thereof vary in opposite senses with changes from one of said operating conditions to the other, one of said output circuits including a time-constant circuit so proportioned and arranged as to maintain said univibrator in said unstable operating condition for an interval longer than the shorter-duration pulses of said signal but shorter than the longer-duration pulses thereof before permitting said univibrator to return to said stable operating condition, whereby said univibrator translates a signal representative of said signal to develop said shorter-duration pulses primarily only in one of said output circuits and to develop said longer-duration pulses primarily in the other of said output circuits.

5. A pulse-signal translating arrangement for translating a signal of pulse wave form having pulse durations of two values comprising: a transitron type of univibrator having stable and unstable operating conditions, including a vacuum tube having an anode, cathode, and a plurality of electron-permeable intermediate electrodes and including an input circuit arranged to have said signal applied thereto; and a control circuit coupled to said input circuit and proportioned to maintain said univibrator in a stable de-energized operating condition in the intervals between the pulses of said signal but to cause said univibrator to initiate operation in said unstable operating condition upon the occurrence of each pulse of said signal; said anode and one of said intermediate electrodes being included in individual signal-output circuits in which the voltages thereof vary in opposite senses with changes from one of said operating conditions to the other, said output circuit including the last-mentioned said intermediate electrode also including a time-constant circuit so proportioned and arranged as to maintain said univibrator in said unstable operating condition for an interval longer than the shorter-duration pulses of said signal but shorter than the longer-duration pulses thereof before permitting said univibrator to return to said stable operating condition, whereby said univibrator translates a signal representative of said signal to develop said shorter-duration pulses primarily only in one of said output circuits and to develop said longer-duration pulses primarily in the other of said output circuits.

6. A pulse-signal translating arrangement for translating a signal of pulse wave form having pulse durations of two values comprising: a transitron type of univibrator having stable and unstable operating conditions, including vacuum tube having an anode, cathode, screen electrode and suppressor electrode and including an input circuit arranged to have said signal applied thereto; and a control circuit coupled to said input circuit and proportioned to maintain said univibrator in a stable de-energized operating condition in the intervals between the pulses of said signal but to cause said univibrator to initiate operation in said unstable operating condition upon the occurrence of each pulse of said signal; said anode and said screen electrode being included in individual signal-output circuits in which the voltages thereof vary in opposite senses with changes from one of said operating conditions to the other, said output circuit including said screen electrode also including a time-constant circuit so proportioned and arranged as to maintain said univibrator in said unstable operating condition for an interval longer than the shorter-duration pulses of said signal but shorter than the longer-duration pulses thereof before permitting said univibrator to return to said stable operating condition, whereby said univibrator translates a signal representative of said signal to develop said shorter-duration pulses primarily only in said screen-electrode output circuit and to develop said longer-duration pulses primarily in said anode output circuit.

7. A pulse-signal translating arrangement for translating a signal of pulse wave form having pulse durations of two values comprising: a transition type of univibrator having stable and unstable operating conditions and including a vacuum tube having an anode, cathode, space-current control electrode, screen electrode and suppressor electrode; and a control circuit arranged to have said signal applied thereto, coupled to said control electrode and proportioned to maintain said univibrator in a stable de-energized operating condition in the intervals between the pulses of said signal but to cause said univibrator to initiate operation in said unstable operating condition upon the occurrence of each pulse of said signal; said anode and said screen electrode being included in individual signal-output circuits in which the voltages thereof vary in opposite senses with changes from one of said operating conditions to the other, said output circuit including said screen electrode also including a time-constant circuit so proportioned and arranged as to maintain said univibrator in said unstable operating condition for an interval longer than the shorter-duration pulses of said signal but shorter than the longer-duration pulse thereof before permitting said univibrator to return to said stable operating condition, whereby said univibrator thanslates a signal representative of said signal to develop said short-duration pulses promarily only in said screen-electrode output circuit and to develop said long-duration pulses promarily in said anode output circuit.

8. A pulse-signal translating arrangement comprising: a transitron univibrator having an input circuit, a screen-grid output circuit including a first load impedance, a time-constant network coupled to said first load impedance and an anode output circuit including a second load impedance, said univibrator also including a vacuum tube having a control electrode and cathode coupled to said input circuit, said input circuit being arranged to have applied thereto a signal of pulse wave form having pulse durations of two values and said input circuit including means for biasing said control electrode to effect anode-current cutoff of said tube during the interval between said pulses; said tube also having a screen-grid electrode coupled to said screen-grid output, circuit, a suppressor grid coupled through said time-constant network to said last-mentioned output circuit and to said cathode, and an anode coupled to said anode output circuit; the said network being so proportioned that the charging and discharging time constants thereof permit univibrator operation only on the longer-duration pulses of said signal, whereby the translation of a signal representative of said signal by said univibrator causes the shorter-duration pulses of said signal to be developed primarily only in said screen-grid output circuit and causes said longer-duration pulses to be developed primarily in said anode output circuit.

JOHN THOMAS YATES.
IAN NORMAN VAUGHAN-JONES.

REFERENCES CITED

The following references are of record in the file of this patent:

UNITED STATES PATENTS

| Number | Name | Date |
|---|---|---|
| 2,177,723 | Kemp | Oct. 31, 1939 |
| 2,293,528 | Barco | Aug. 18, 1942 |

FOREIGN PATENTS

| Number | Country | Date |
|---|---|---|
| 366,096 | Italy | Dec. 19, 1938 |
| 497,371 | Great Britain | Dec. 19, 1938 |